United States Patent
Walid et al.

(10) Patent No.: US 7,352,747 B2
(45) Date of Patent: Apr. 1, 2008

(54) SYSTEM AND METHOD OF NETWORK TRAFFIC ASSIGNMENT ON MULTIPLE PARALLEL LINKS BETWEEN IP/MPLS ROUTERS

(75) Inventors: Anwar Walid, Murray Hill, NJ (US); Indra Widjaja, Florham Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 924 days.

(21) Appl. No.: 10/209,571

(22) Filed: Jul. 31, 2002

(65) Prior Publication Data
US 2004/0022277 A1 Feb. 5, 2004

(51) Int. Cl.
*H04L 12/56* (2006.01)
(52) U.S. Cl. .................. 370/392; 370/386
(58) Field of Classification Search ............. 370/536, 370/386, 392, 229, 389; 359/118
See application file for complete search history.

(56) References Cited

U.S. PATENT DOCUMENTS

| | | | |
|---|---|---|---|
| 6,229,822 B1* | 5/2001 | Chow et al. ............... 370/474 |
| 6,977,932 B1* | 12/2005 | Hauck ........................ 370/392 |
| 7,082,102 B1* | 7/2006 | Wright ....................... 370/229 |
| 2002/0109879 A1* | 8/2002 | Wing So ................... 359/118 |
| 2003/0137978 A1* | 7/2003 | Kanetake .................... 370/386 |
| 2004/0022539 A1* | 2/2004 | Bannister et al. ............. 398/55 |

OTHER PUBLICATIONS

Kireeti Kompella et al. "Link Bundling in MPLS Traffic Engineering", IETF, Internet Draft, draft-kompella-mpls-bundle-04.txt, Nov. 2000.*
Ayan Banerjee et al. "Generalized Mulitprotocol Label Switching: An Overview of Routing and Management Enhancements", IEEE Communications Magazine, Jan. 2001.*
K. Kompella et al., "Link Bundling in MPLS Traffic Engineering," Internet Draft <draft-kompella-mpls-bundle-05.txt>, Feb. 2001.

* cited by examiner

*Primary Examiner*—Chi Pham
*Assistant Examiner*—Albert T. Chou

(57) ABSTRACT

In the operation of an MPLS network or the like, a network node receives a plurality of packets assigned to a label switched path (LSP) which exits the node on a link bundle. The node forwards the received packets such that packets assigned to the LSP are distributed over two or more distinct component links of the bundle.

10 Claims, 6 Drawing Sheets

SWITCH ARCHITECTURE

SWITCH ARCHITECTURE

FIG. 6

| INCOMING LABEL | OUTGOING LABEL | GROUP | BUNDLE OFFSET | MASK |
|---|---|---|---|---|
| 101 | 58 | 1 | 0 | 0 x 00 |
| 46 | 4562 | 2 | 8 | 0 x 07 |
| 2035 | 298 | 8 | 4 | 0 x 03 |
| 156 | 317 | 2 | 0 | 0 x 07 |

SYSTEM AND METHOD OF NETWORK TRAFFIC ASSIGNMENT ON MULTIPLE PARALLEL LINKS BETWEEN IP/MPLS ROUTERS

FIELD OF THE INVENTION

This invention relates to the routing of packets in networks subject to the Internet Protocol and related protocols. More specifically, the invention relates to the routing of packets on bundled links in networks in which MultiProtocol Label Switching has been implemented.

ART BACKGROUND

Many present-day Internet Protocol (IP) networks will eventually have to be upgraded to meet future levels of demand for bandwidth capacity. This is true for networks on which MultiProtocol Label Switching has been implemented ("MPLS networks") as well as for other IP networks.

In some scenarios for upgrading the networks, older links, having relatively low capacity, are replaced by higher-capacity links. In typical scenarios, the new link has four times the carrying capacity of the old link. Such scenarios have drawbacks. One drawback is that it is very expensive to totally replace a link. Another drawback is that in general, the new link will be utilized at a low level of efficiency at the time of upgrade, typically less than 25% efficiency.

Because of these, and other, drawbacks, a second scenario has been considered. The second scenario involves upgrading the links incrementally. That is, capacity is increased between a pair of routers by adding one or more new links in parallel with those that are already installed between the given routers. Such a scenario offers lower cost at each stage of expansion. Such a scenario will also often prolong the useful lifetime of existing routers because it can generally be implemented within the constraints of existing processing speeds.

The practicality of incremental upgrading, at least of MPLS networks, can be enhanced by the practice of link bundling as described, for example, in K. Kompella et al., "Link Bundling in MPLS Traffic Engineering," Internet Draft <draft-kompella-mpls-bundle-05.txt> (February 2001). In link bundling, the pair of routers is connected by multiple parallel links having the same attributes. The parallel links are treated as a single "bundled link" when routing tables are computed. This can significantly reduce the processing load on the routers that compute the routing tables. The individual links that collectively define the bundled link are referred to as "component links."

In link bundling, a given Label Switched Path (LSP) cannot be divided among the component links of the bundle. Instead, during setup of an LSP with a given bandwidth reservation B, the corresponding router will search for a component link with unreserved bandwidth greater than B. The router will associate the LSP with one particular such link, if, indeed, such a link can be found. If no component link is found having unreserved bandwidth B, the LSP request will fail.

Although useful, link bundling does not consistently achieve the highest possible utilization of available bandwidth on the bundled link. That is, even if the total unreserved bandwidth on the bundled link exceeds B, the LSP request will fail if the unreserved bandwidth is distributed over two or more component links in parcels that are individually smaller than B. In many such cases, the unreserved bandwidth will go unused and efficiency will suffer.

Thus, there is still a need for a more efficient scheme of link bundling.

SUMMARY OF THE INVENTION

The invention involves a link bundling scheme that achieves greater efficiency by permitting packets within a given LSP to be distributed among the component links of a bundle. Specific embodiments of the invention prevent the packets of a given flow from getting out of order by distributing the LSP packets over component links in groupings no smaller than a flow.

In one broad aspect, the invention is a method which includes a step of receiving, at a network node, a plurality of packets assigned to a label switched path (LSP) which exits the node on a link bundle. The method includes a further step of forwarding the received packets such that packets assigned to the LSP are distributed over two or more distinct component links of the bundle.

BRIEF DESCRIPTION OF THE DRAWING

FIG. 6, given for illustrative purposes, is a portion of a hypothetical forwarding table that could reside within a packet switch or router according to the present invention, in some embodiments. The table of FIG. 6 includes an example of link-numbering data of the same kind illustrated in FIG. 5. However, there is no intentional correspondence between the data of FIG. 5 and those of FIG. 6.

DETAILED DESCRIPTION

An MPLS network includes MPLS-enabled routers interconnected by links. An MPLS-enabled router is referred to as a Label Switch Router (LSR). The packets constituting traffic through the network are grouped in flows. Each flow is a sequence of packets characterized, typically, by source and destination addresses, source and destination port identifiers, and an application type that are common to all packets belonging to that flow. Often, the application type is "TCP connection."

Each flow passes through the MPLS network from an ingress LSR to an egress LSR. Typical LSPs set up by the network will each accommodate a large number of flows that have common ingress and egress LSRs. The specific sequence of routers (LSRs) traversed by the path (LSP) is assigned according to a routing table, which has been precomputed using a set of rules referred to as an Interior Gateway Protocol (IGP).

The ingress LSR will typically initiate a setup request for an LSP by sending out an RSVP-TE Path message (hereafter, "Path message"). This message will pass through each intermediate LSR along the path, and will finally reach the egress LSR. When the egress LSR receives the Path message, it issues a Resv message traveling the reverse path back to the ingress LSR.

Labels are allocated by the Resv message. For a given LSP, the label in the Resv message received from a downstream LSR is used to write the outgoing label value, the group value and the bundle value (i.e., offset and mask) of the forwarding table. The label issued by the present LSR is used to perform lookup based on the incoming label value.

When a link bundle connects a pair of LSRs along the path, the upstream LSR according to the present invention can forward the Path message along any one of the component links, since, in contrast to the prior art, there is no restriction that an LSP may be associated with only one component link. If the unreserved bandwidth over the whole bundle is at least the requested bandwidth, the LSP request will be satisfied for that pair of LSRs, and bandwidth reservation will be made on the bundle.

It will be appreciated that the greatest efficiencies will be achieved, on average, only when the component flows of the LSP are distributed uniformly over the component links of the bundle. We have developed a switch architecture which, when implemented within the upstream LSR, will generally make a very uniform distribution of flows among the component links. Our switch architecture, which includes a plurality of individual processors in each of three stages, also makes a very uniform distribution of flows among its internal packet switching elements (PSEs) and links. This approach permits efficient operation and minimizes internal overloads.

Our scheme for distributing LSP traffic over a bundle will be referred to herein as Link Bundling with Distributing traffic Assignment (LB/DA).

Figure 1A:
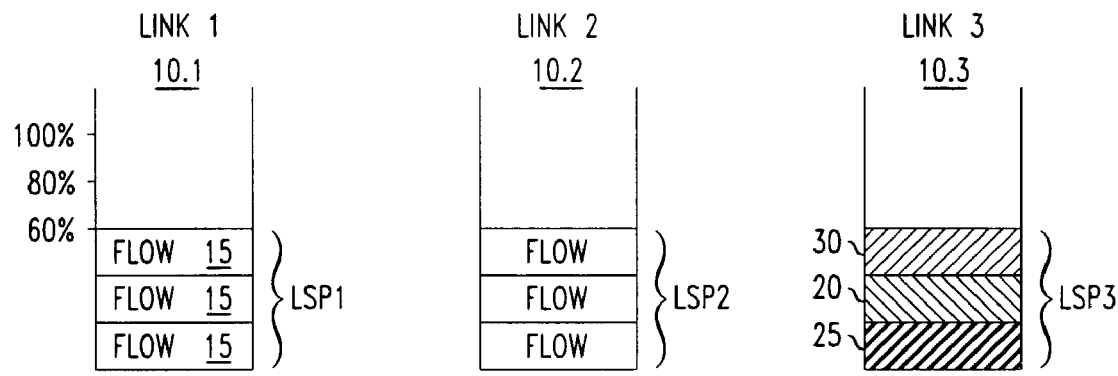
FIGS. 1A and 1B illustrate, via a hypothetical example, the manner in which the present invention can make more efficient use of the capacity of bundled links than is realized by conventional link-bundling methods. As explained below, FIG. 1A analogizes the conventional method as a bin-packing problem, and FIG. 1B similarly analogizes the method of the present invention.
Figure 1B:
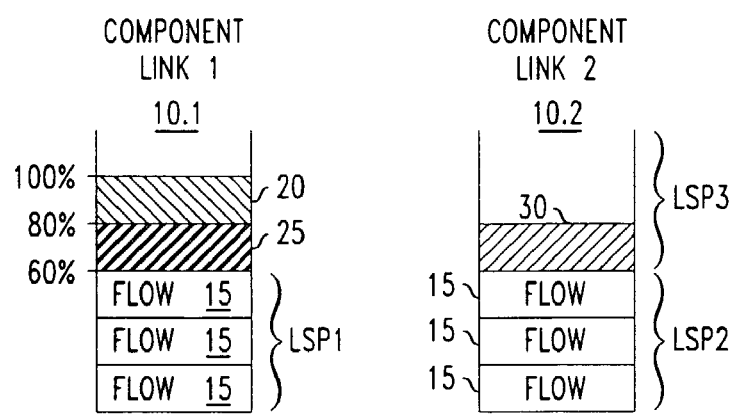

FIGS. 1A and 1B provide a simplified example illustrating the efficiencies that can be achieved by LB/DA. Each of links 10.1, 10.2, and 10.3 of FIG. 1A is occupied to 60% of capacity by a bandwidth reservation for a respective one of the LSPs labeled LSP1, LSP2, and LSP3 in the figure. As illustrated in the figure, each of the LSPs has assigned to it three distinct flows, each identified as a flow in the figure by the shared reference numeral 15 or one of the unshared reference numerals 20, 25, 30. Clearly, the average efficiency with which the three links are utilized is 60%. Under conventional link-bundling procedures, this efficiency cannot be improved, because taken individually, no link has sufficient unreserved capacity to accept the total traffic from any other LSP.

However, as illustrated in FIG. 1B, the efficiency can be improved if the traffic in LSP3 can be divided and distributed between links 10.1 and 10.2, which in FIG. 1B have been designated as component links 1 and 2, respectively. As shown, flows 20 and 25 are reassigned to component link 1, and flow 30 is reassigned to component link 2. As a consequence, only two links are used, and the average efficiency with which they are used is 90%. It will be noted that in the illustrated example, individual flows were kept together, and were not subdivided. It should be noted in this regard that each individual flow will typically be much smaller than the link capacity. As a consequence, the distribution of traffic in, e.g., the two component links illustrated in FIG. 1B will generally be very similar, in practice.

Figure 2:
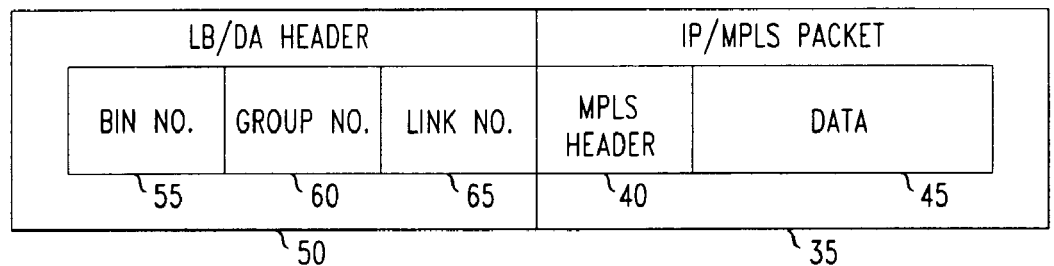
FIG. 2 is a tabular representation of an internal IP/MPLS packet inside a router that has been augmented with internal header information according to the present invention in one embodiment.

FIG. 2 illustrates the header information that is appended to each packet as it enters the LB/DA switch. As shown in the figure, conventional IP/MLPS packet 35 includes MPLS header 40 and data sequence 45. At ingress to the LB/DA switch, LB/DA header 50 is appended to this packet. (It should be noted in this regard that other internal headers not directly related to the present invention may also be appended for other purposes.) At egress from the switch, the LB/DA header is deleted. The information obtainable from MPLS header 40 includes the "5-tuple" information that defines the flow, and which has been described above.

As shown in the figure, an illustrative LB/DA header includes a bin number, a group number, and a link number, indicated respectively by reference numerals 55, 60, and 65. These numbers are used to control the disposition of the packet within the switch, as will be described below. As a general rule, the group number will be determined by the identity of the outgoing bundle, and thus will be obtained from the forwarding table. As will be seen, the bin number is determined by the 5-tuple of the corresponding packet, and the link number is determined by both the 5-tuple and the forwarding table.

Figure 3:
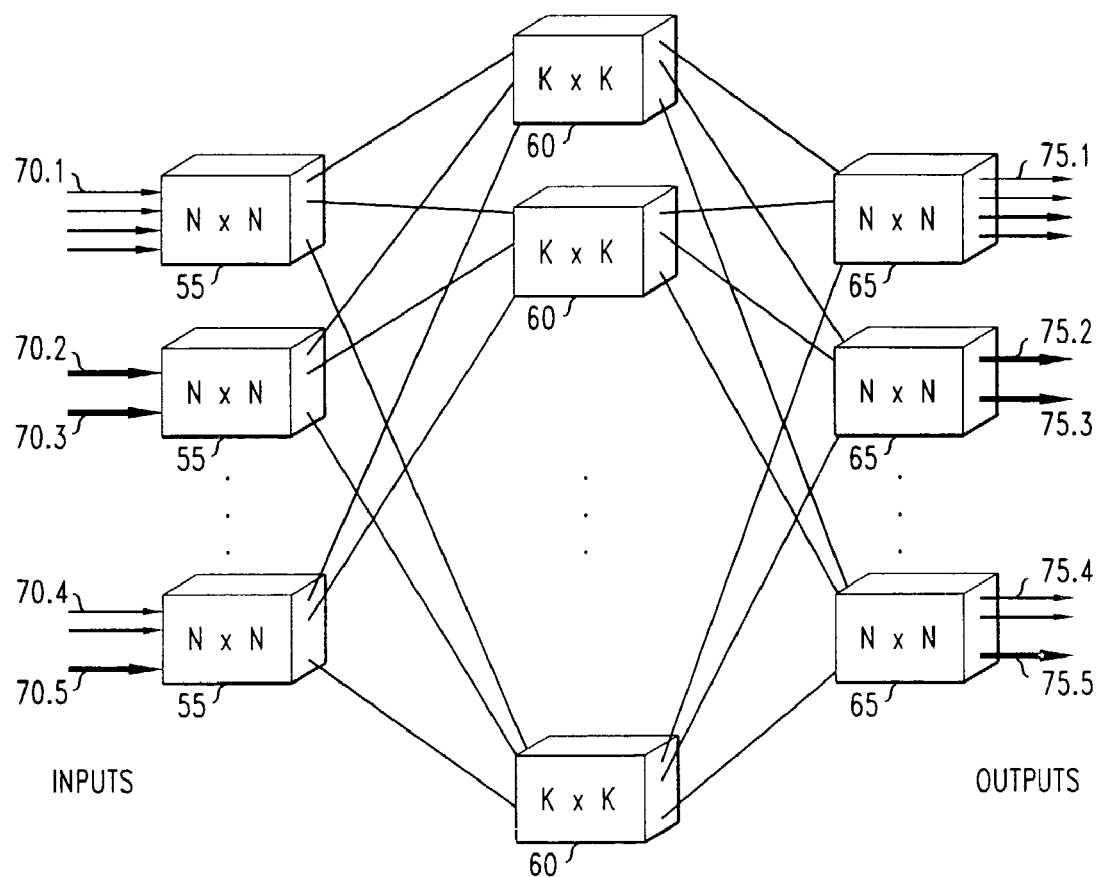
FIG. 3 is a schematic block diagram illustrating the architecture of a packet switch according to the invention in one embodiment.

FIG. 3 is a block diagram of our new switch architecture. As shown in the figure, the switch includes three stages of packet switching elements (PSEs). Stage 1 consists of PSEs 55, Stage 2 consists of PSEs 60, and Stage 3 consists of PSEs 65. For example, and not for limitation, each PSE may be an output-buffered packet switch.

Each of the Stage-1 PSEs is shown in the figure as receiving input from a plurality of input bundles, and each of the Stage-3 PSEs is similarly shown as forwarding output into a plurality of output bundles. To avoid complicating the figure, only a few representative input and output bundles have been associated with reference numerals. Thus, reference numerals 70.1-70.5 indicate representative input bundles, and reference numerals 75.1-75.5 likewise indicate representative output bundles.

In fact, it will often be the case that each bundle interfaced with the switch is a bidirectional bundle. In such cases, it will be understood that corresponding pairs of input and output bundles as shown in the figure, such as 70.1-75.1, 70.2-75.2, etc., are symbolic representations in which the bidirectional bundle has been conceptually separated into an equivalent pair of oppositely directed unidirectional bundles.

Each of the bundles shown in the figure is shown as spanning fewer than all the input ports of the PSE to which it is interfaced. However, alternative arrangements are readily implemented in which a given bundle may interface to more than one PSE, or, indeed, may span more than the total number of input ports of a given PSE to which it is interfaced.

Each of the Stage-1 PSEs has one output coupled to a respective input of each of the Stage-2 PSEs, and each Stage-2 PSE likewise has one output coupled to a respective input of each of the Stage-3 PSEs. There may sometimes be a need for a given functional switching element to have more input or output ports than are offered by a single PSE. It will be understood that in such cases, two or more PSEs are readily grouped together and treated, in the present context, as a single large PSE.

In the embodiment illustrated in FIG. 3, the number of Stage-1 and of Stage-3 PSEs is K, and the number of Stage-2 PSEs is N. Each of the Stage-1 and Stage-3 PSEs has N inputs and N outputs, i.e., it is N×N, and each of the Stage-2 PSEs is K×K.

Optionally, the number of Stage-1 inputs and the number of Stage-3 outputs could be different from N. However, the PSEs that are commercially available at present generally have equal numbers of inputs and outputs.

There is no fundamental restriction on the values taken by N and K. Instead, the choice of these values will be dictated, mainly, by the desired size and capacity of the switch and by the cost of implementing it.

It will be evident from FIG. 3 that the switch is effective for directing traffic from any input bundle to any output bundle. This is achieved by first, forwarding each packet from Stage 1 to a selected PSE of Stage 2 based on the bin number. Then, the packet is forwarded from Stage 2 to a selected PSE of Stage 3 based on group number. In Stage 3, the packet is forwarded to a selected output link based on link number. As will be seen, the manner in which bin numbers are determined assures that traffic load is uniformly distributed over the Stage-2 PSEs. It will also be seen that the manner in which link numbers are determined assures that traffic load is uniformly distributed over the component links of each output bundle. An important advantage of the present invention is that this feature of uniform distribution allows the switch to run at a speed roughly equal to the speed of the component link.

Figure 4:
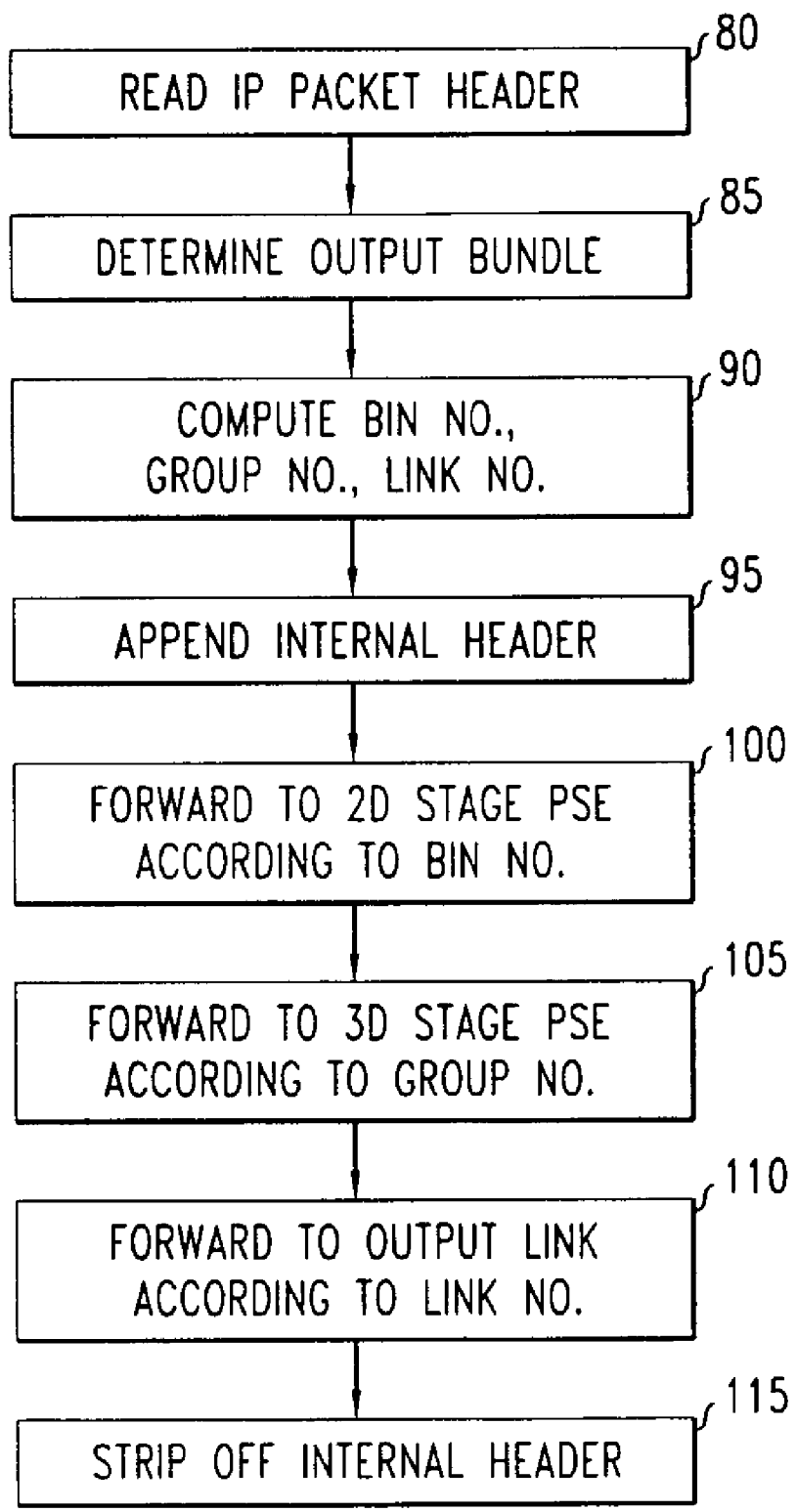
FIG. 4 is a high-level flowchart of an illustrative sequence of operations to be performed by a switch such as the switch of FIG. 3.

The high-level functioning of the respective stages of the switch of FIG. 3 is illustrated by the flowchart of FIG. 4. At block 80, a Stage-1 PSE reads the IP header of an incoming packet. At block 85, by reference to the forwarding table, the Stage-1 PSE determines which output bundle the incoming packet is destined for. At block 90, the Stage-1 PSE computes the bin number, the group number, and the link number. A procedure for making these computations is described below. At block 95, the Stage-1 PSE appends an internal header, such as header 50 of FIG. 2, is appended to the incoming packet. At block 100, the packet is forwarded to the Stage-2 PSE corresponding to the bin number that has been assigned. At block 105, the Stage-2 PSE reads the assigned group number and forwards the incoming packet to the corresponding Stage-3 PSE. At block 110, the Stage-3 PSE reads the assigned link number and forwards the packet to the corresponding output link. As indicated at block 115, the Stage-3 PSE also strips off the internal header from the now outgoing packet.

Figure 5:
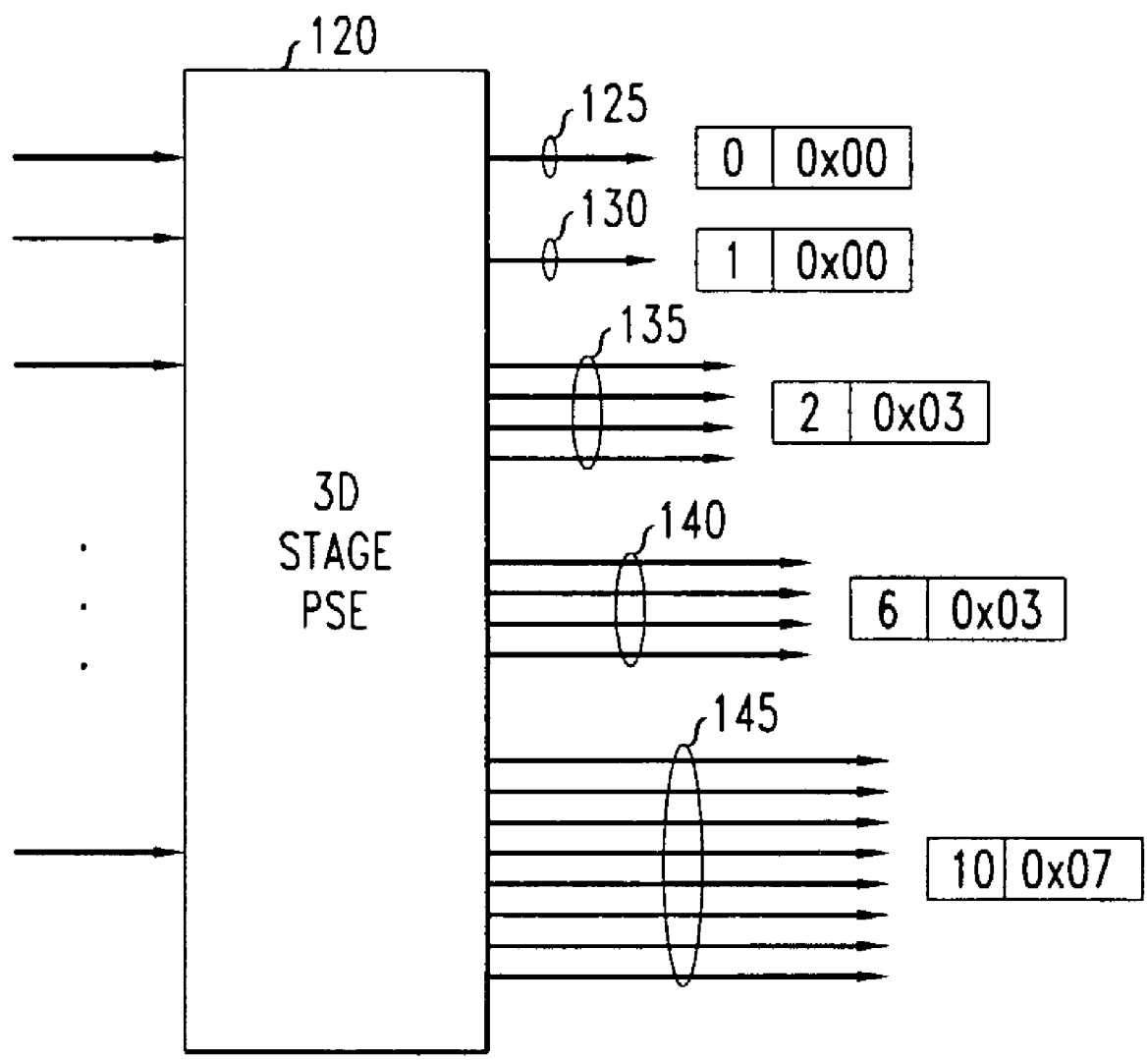
FIG. 5 is a block diagram showing a single third-stage packet switching element (PSE) from the switch of FIG. 3. For pedagogical purposes, a simplified PSE is shown. Illustrated in the figure is a numbering system for output links of the PSE that is useful in the practice of the present invention.

Before entering into a more detailed explanation of how the switch operates, we will describe an advantageous method for numbering the output bundles and output links associated with a given Stage-3 PSE. As illustrated in FIG. 5, Stage-3 PSE 120 has five output bundles, identified by reference numerals 125-145. It will be seen that bundles 125 and 130 have one component link apiece, bundles 130 and 135 each have four links, and bundle 140 has eight links. For purposes of the present discussion, these five bundles are deemed to constitute one group.

We have found it advantageous to number the total of eighteen links of the group with sequential numbers from 0 to 17. These are the link numbers. We have also found it advantageous to assign to each bundle an "offset" number equal to the sequential number of the first link in that bundle. Thus, the offsets for bundles 125-145 are 0, 1, 2, 6, and 10, respectively. For reasons that will be made clear below, we have further found it advantageous to assign a number, referred to as a "mask," to each of the bundles. The mask is one less than the number of links in the bundle. Thus, the masks for bundles 125-145 are, respectively, 0, 0, 3, 3, and 7. In FIG. 5, the offset and mask of each bundle are indicated to the right of the bundle. In the figure, the masks are written in hexadecimal notation. Although the present invention is not restricted to the above representation, such a representation is advantageous for high-speed implementation that uses only simple binary arithmetic.

FIG. 6 is an example of part of a forwarding table, resident within the switch, that contains the group numbers and the offsets and masks that identify the bundles within a group. (There is no intentional correspondence between the table entries in FIG. 6 and the link bundles of FIG. 5.) It is conventional for MPLS routers to compile a forwarding table, which includes a Next Hop Label Forwarding Entry (NHLFE) for each packet. The outgoing labels, group numbers, offsets, and masks are here made part of the NHLFE. For an implementation that requires no speedup in the forwarding lookup processing, the forwarding table needs to be replicated on each component link.

Figure 7:
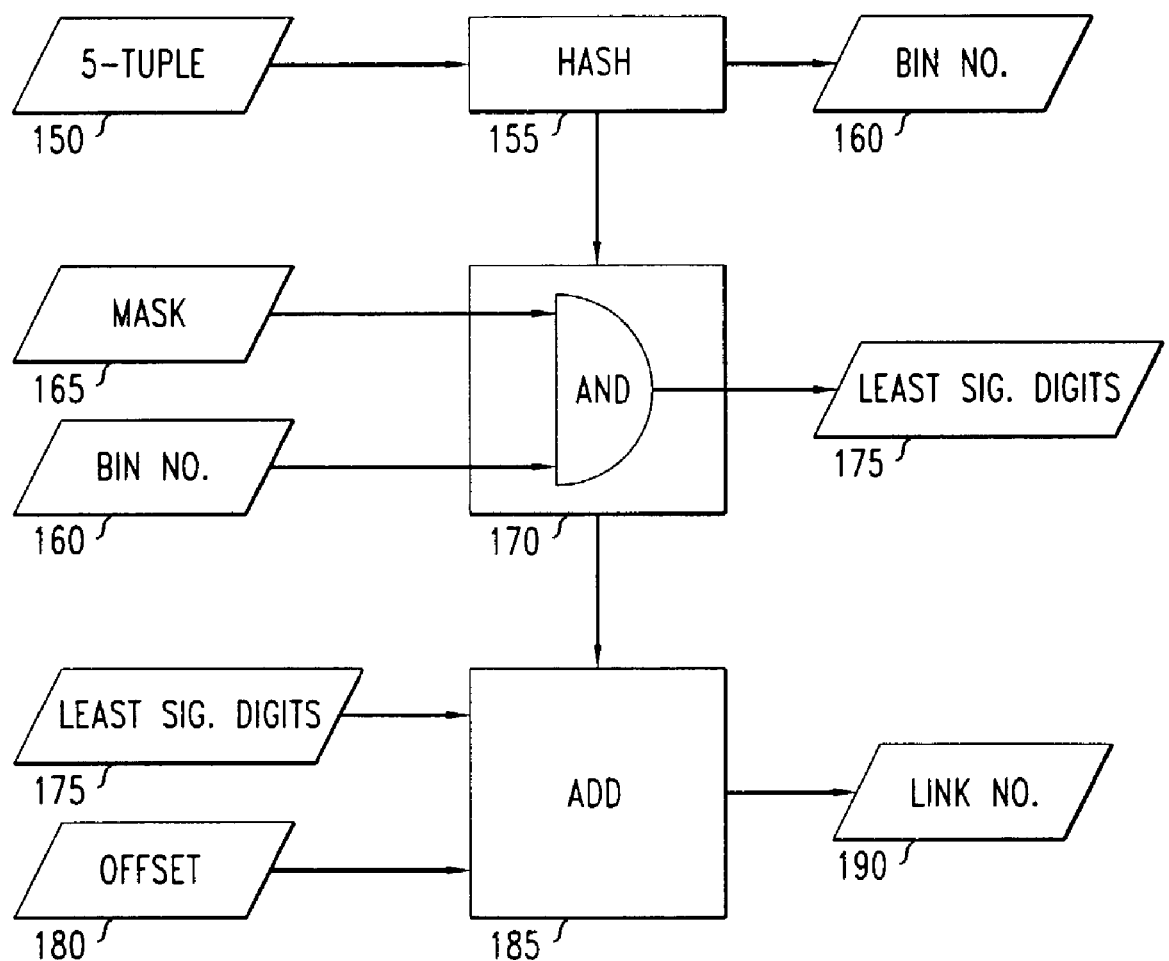
FIG. 7 is a flowchart showing a procedure for generating bin numbers and link numbers within a switch such as the switch of FIG. 3.

FIG. 7 is a flowchart showing an exemplary procedure for generating bin numbers and link numbers. It will be understood that as illustrated in FIG. 7, the flow of data is from left to right, whereas the flow of control is from the top toward the bottom of the figure.

At block 155 of FIG. 7, the 5-tuple data 150 from an incoming packet are subjected to a hashing function. For example, and not as a limitation, the hashing function can be implemented in high speed using a Cyclic Redundancy Check (CRC) polynomial code of the kind commonly used for error checking.

It should be noted that without deviating from the scope and spirit of the invention, the hashing function may be applied to a subset of the 5-tuple that comprises less than all of the 5-tuple information. Likewise, the hashing function may be applied to some other information alternative to 5-tuple information. In particular, it should be noted that the methods of the present invention are applicable to types of packetized traffic, including types of non-IP traffic, in which information useful in the present context is not packaged as 5-tuple information.

The output of the hashing operation, or a sequence of binary digits obtained therefrom, is taken as the bin number 160. It will be understood from the above discussion that the number of distinct bins is N. If the range of possible outputs from the hashing operation is greater than N, either out-of-range outputs can be dropped, or a many-to-few mapping can be employed to map each of the possible outputs to one of the bins. If, for example, N is a power of two, then it is advantageous to keep the $\log_2 N$ least significant binary digits of the hashed output. Each output sequence of $\log_2 N$ bits will map to a respective one of the bins. The advantage of the hashing function is that it will uniformly generate bin numbers pseudo-randomly. As a consequence, traffic being forwarded from the first stage of the switch will be uniformly distributed over the PSEs of the second stage while maintaning packet sequence for any flow.

At block 170 of FIG. 7, the mask 165 for the incoming packet is obtained from the forwarding table and used to generate a subsequence 175 of the bin number. According to the example illustrated in the figure, a parallel, logical AND operation is performed at block 170, with mask 165 and bin number 160 as inputs. The output of such an operation will be a sequence consisting of the $\log_2 l$ least significant digits of bin number 160, where l is the total number of component links of the bundle corresponding to mask 165. Because of the pseudo-random manner in which the bin number has been generated, this procedure is equivalent to a uniform selection of component links from the bundle subject to maintaining packet sequence for any flow.

At block 185 of FIG. 7, the link number 190 of the selected link is generated by obtaining offset 180 from the forwarding table, and adding to it the value of masked sequence 175. Because offset 180 indexes the first link in a bundle and sequence 175 indexes a relative link position within a bundle, the sum of these two numbers indexes a link position within the entire group. That is, it is equal to a link number.

Because the relative link position that has been selected within the bundle is pseudo-random, there will be a uniform distribution of packets over the component links of the bundle.

It should be noted that all packets having the same 5-tuple data will be given the same bin number in the operation represented by block 155 of the figure. Since the 5-tuple identifies the flow to which the packet belongs, all packets of a given flow will get the same bin number and hence will be directed to the same Stage-2 PSE. As a consequence, flows will not be broken up. Instead, all packets of a given flow will take the same path from the first to the second stage, and from the second to the third stage, of the switch. This property will prevent the packets of a given flow from getting out of order during their transit of the switch.

It should be noted further that the same unique assignment of bin numbers to flows will also prevent a given flow from being broken up among multiple output component links. That is, because sequence 175 is a sequence of least significant digits of a bin number, all packets of a given flow will also have the same sequence 175. The offset will of course be the same for all packets of a given flow, because the offset depends on the output bundle, which is determined in advance for each flow. Therefore, the sum of sequence 175 with the offset must also be the same for each packet of a given flow. As a conseqence, all packets of a given flow will be forwarded onto the same component link of the bundle.

The invention claimed is:

1. A method, comprising:
   receiving, at a network node, a plurality of packets assigned to a label switched path (LSP) which exits the node on a link bundle;
   forwarding the received packets such that packets assigned to the LSP are distributed over two or more distinct component links of the bundle, wherein the forwarding is carried out by a routing device, and during the forwarding, all packets belonging to the same flow traverse the same internal path within the routing device; and
   computing, for each packet, a number that is the same for packets that belong to the same flow, but different for packets that belong to different flows, and wherein the forwarding is carried out such that packets are distributed over the component links according to the respective values of said computed number.

2. The method of claim 1, wherein:
   each packet, as received, includes header information; and
   the computed number for each packet is a hash function of at least a portion of the header information.

3. A method, comprising:
   receiving, at a network node, a plurality of packets assigned to a label switched path (LSP) which exits the node on a link bundle; and
   forwarding the received packets such that packets assigned to the LSP are distributed over two or more distinct component links of the bundle, wherein the forwarding is carried out by a routing device having a first, a second, and a third stage, and during the forwarding, the first stage forwards packets to the second stage, the second stage forwards packets to the third stage, and the third stage forwards packets onto component links.

4. The method of claim 3, wherein each of said first, second, and third stages comprises a plurality of packet switching elements (PSEs), and in the forwarding, each packet is forwarded from a PSE of the first stage to a selected PSE of the second stage, and from there to a selected PSE of the third stage.

5. The method of claim 4, further comprising selecting, for each packet, a second-stage PSE to which to forward said packet.

6. The method of claim 5, wherein:
   the method further comprises computing, for each packet, a number that is pseudorandom as between packets belonging to different flows, but is the same for packets belonging to the same flow; and
   the selection of a second-stage PSE is based, at least in part, on the value of the pseudorandom number.

7. The method of claim 6, wherein:
   each packet, as received, includes header information; and
   the pseudorandom number is a hash function of at least a portion of the header information.

8. The method of claim 6, wherein:
   each received packet is destined for a particular link bundle; and
   the selection of a third-stage PSE for a given packet is determined by the destined link bundle of that packet.

9. The method of claim 8, further comprising:
   selecting, for each packet, a component link of that packet's destined link bundle; and
   forwarding that packet onto the selected component link;
   wherein the selection of a component link is based at least in part on the value of the pseudorandom number.

10. The method of claim 9, wherein, for each packet, a sequence of least significant digits of the corresponding pseudorandom number is used to determine the position of the selected component link within the destined link bundle.

* * * * *